R. DANIELS.
Self Raking Harvester.

No. 18,390.

3 Sheets—Sheet 2.

Patented Oct. 13, 1857.

R. DANIELS.
Self Raking Harvester.

No. 18,390.

3 Sheets—Sheet 3.

Patented Oct. 13, 1857.

UNITED STATES PATENT OFFICE.

REUBEN DANIELS, OF WOODSTOCK, VERMONT.

IMPROVEMENT IN HARVESTERS.

Specification forming part of Letters Patent No. 18,390, dated October 13, 1857.

*To all whom it may concern:*

Be it known that I, REUBEN DANIELS, of Woodstock, in the county of Windsor and State of Vermont, have invented certain new and useful Improvements in Self-Raking Harvesters; and I do hereby declare the following to be a full, clear, and exact description of the same, reference being had to the accompanying drawings, forming a part of this specification, and in which—

Figure 1:
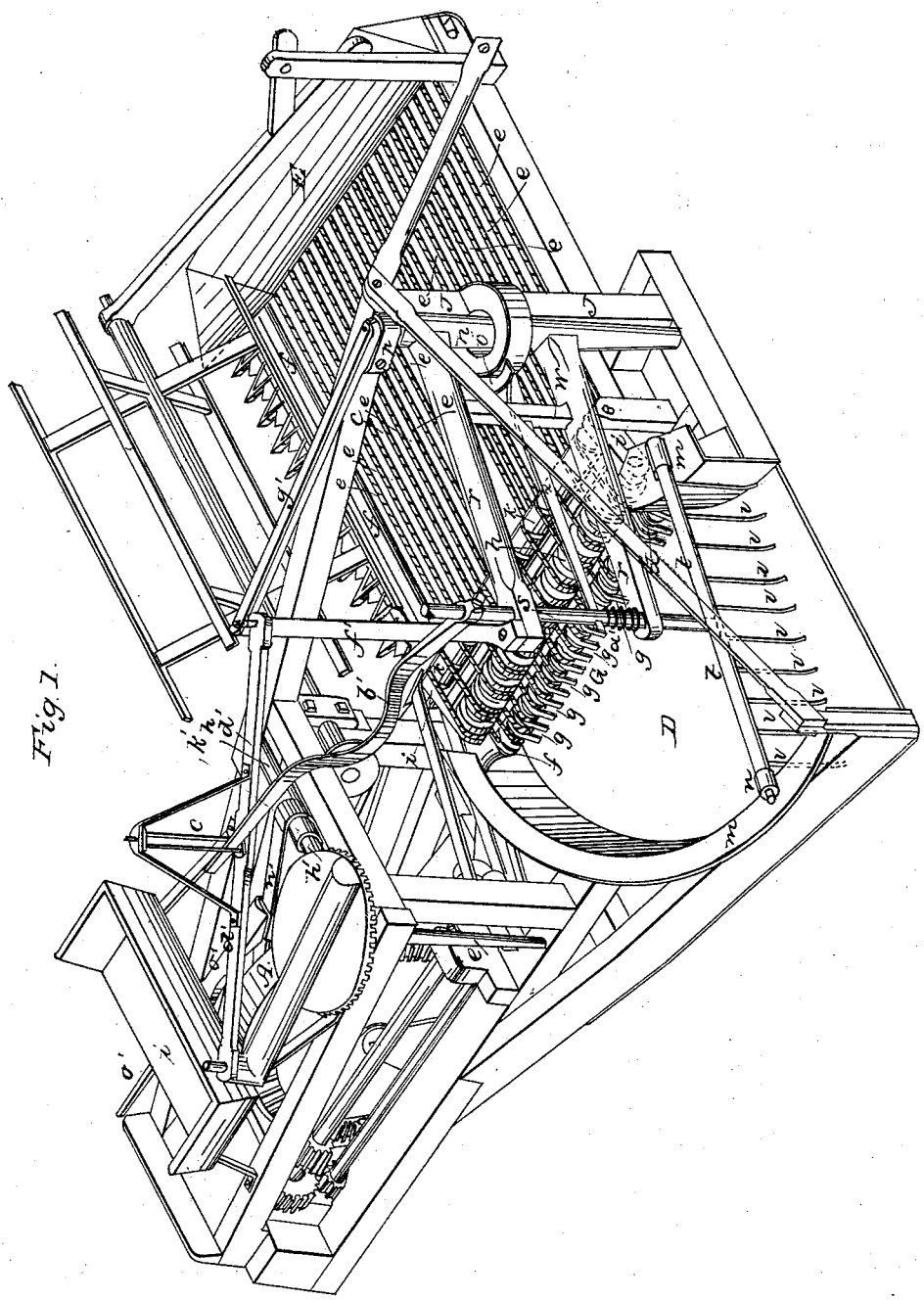
Figure 2:
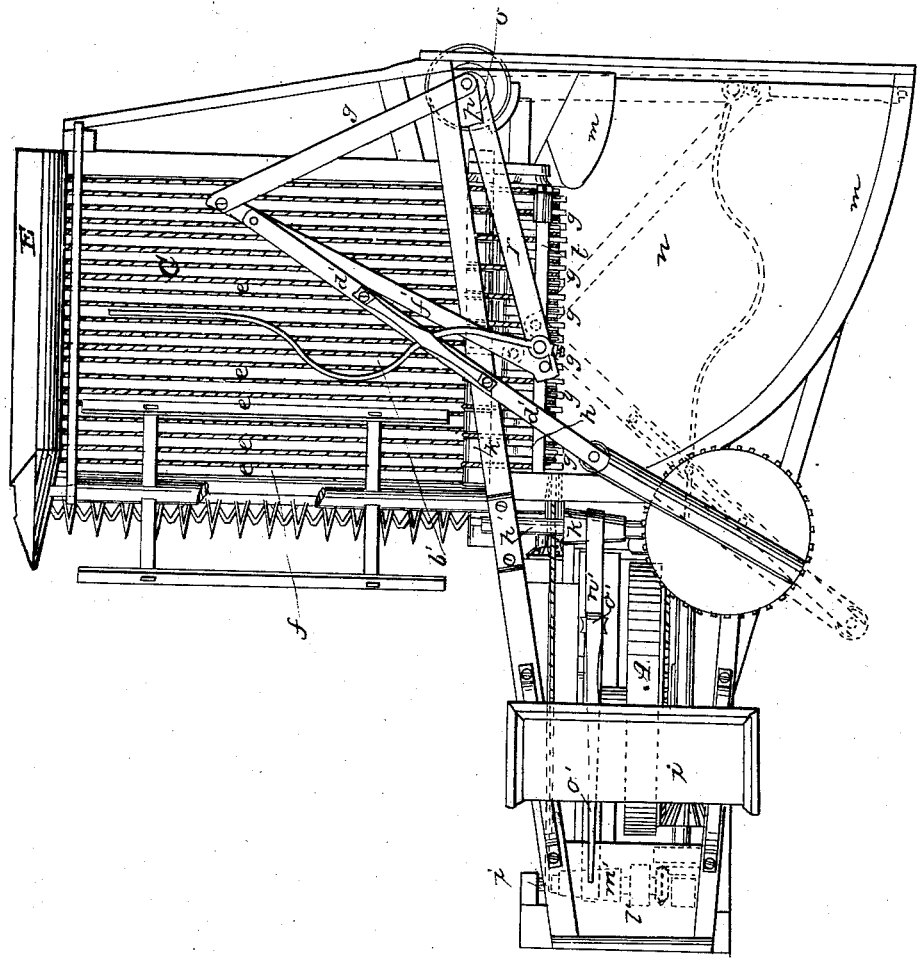
Figure 3:
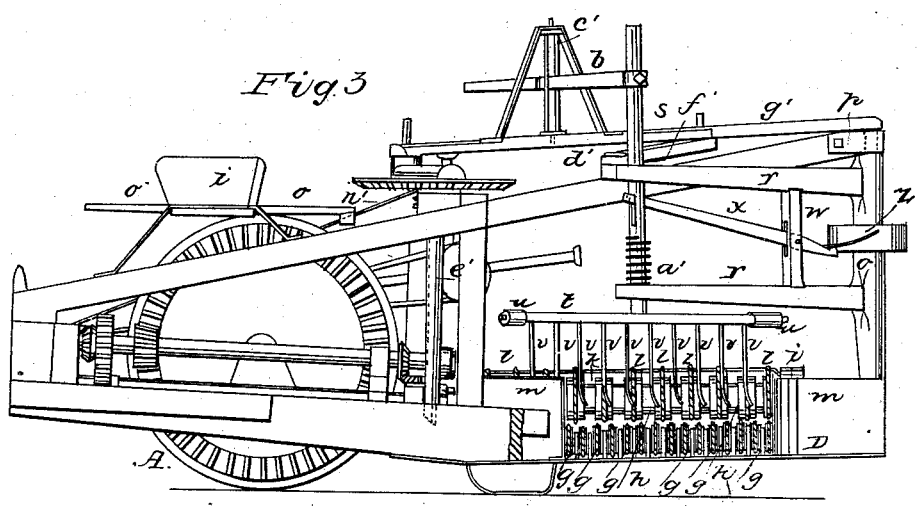
Figure 4:
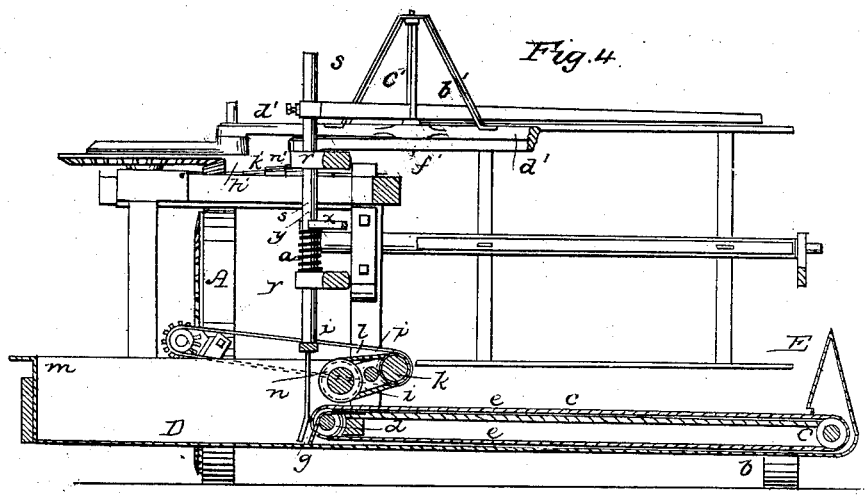

Figure 1 represents an isometrical perspective of a harvester embracing my improvements. Fig. 2 represents a plan of the same. Fig. 3 represents an elevation of the outer or stubble side of the machine, with a portion of the guard of the discharging-platform removed, and showing the rake raised above the platform; and Fig. 4 represents a section through the supporting and discharging platforms of my improved harvester, the rake having fallen to the position from which it starts to remove the grain.

The object of my improvement is to divide the delivered grain on the discharging-platform from that which is being delivered by the carrying-bands, to prevent collision between the rake and the mechanism which supports it as it descends in order to divide the grain and discharge it from the machine, and also to support the rake in the arms that communicate to it its reciprocating motion for the purpose of discharging the gavels, so that it may turn on its axis and also rise and fall vertically on these arms.

My invention for effecting these objects consists, first, in holding the grain on the carrying-bands by means of a yielding-pressure feed-roller, which yields to the mass of grain passing under it, yet holds it with sufficient force on the bands to prevent the rake from drawing it out, so that the rake, as it sweeps forward to discharge the gavel, divides the delivered grain from the undelivered portion on the bands; second, in arranging an elastic comb, whose teeth pass between the carrying-bands and prevent the grain from following them back under the receiving-platform, so as to be directly under the rake when it falls at the end of its backward motion, and also to coincide with the rake-teeth, so that the latter may slide down the comb to the lower or discharging platform; thereby not only does the comb perform the function of detaching the grain from the bands, but also prevents the shock that the rake would otherwise communicate to its supporting mechanism when it descends after having passed over the grain on its backward motion, in order to be in position to sweep the delivered grain from the platform on its forward movement; third, in arranging the rake in the arms that support and give to it its reciprocating movement in connection with the mechanism for raising, lowering, and turning it on its axis in these arms, so that it is free to rise and fall vertically in its bearings, in order to pass over the grain on its backward motion, and then descend to the level of the discharging-platform to sweep off the gavel on its forward motion, and to turn on its axis, that it may be parallel to the inner and outer edge of the platform at the termination of its movement in both directions.

The accompanying drawings represent a self-raking harvester embracing my improvements.

The machine is supported by a main driving-wheel, A, and two shoes or wheels, $a$ $b$, one, $a$, of which is placed just back of the divider, and the other, $b$, at the outer end of the discharging-platform. It is also provided with suitable gearing to give motion to the reel and cutter-bar; but as these parts in their arrangement and operation are similar to those in other machines, it is not deemed necessary to describe them particularly here.

At each end of the supporting-platform C is arranged a series of grooved pulleys, $c$ $d$, for the reception of endless cords or bands $e$ $f$, which, passing around them, form an endless receiving and carrying apron to convey the cut grain to the discharging-platform D. These cords are protected on the under side by a thin partition. The endless cords $e$ in this instance are of wool, but may be made of hair or other animal fiber. The band $f$ next the cutter-bar is larger than the others, and composed of close twisted hemp cord, but may be of wire or vulcanized rubber or of any smooth durable material, and must be of sufficient size to raise the butt-ends of the stalks slightly above adjacent bands. A divider, E, is extended back the entire width of the supporting-platform C, directly over the inner pulleys, $c$, and is triangular in its cross-section. Its outer sloping side is connected with the partition on the under side of the platform, thus protecting the pulleys from the grain on that side, while its inner sloping side deflects the grain as it is brought down by the reel and prevents it from falling on the pulleys or becoming entangled between the pulleys and bands.

To the outer end of the supporting-platform C is attached an elastic stripping-comb, G, the teeth $g$ of which are bent over the shaft of the pulleys $d$ between the bands, and extend over the discharging-platform D, so as to prevent the grain, after it has been brought to this platform by the bands, from following them under the supporting-platform C. A grooved pressure-roller, $h$, placed above and slightly in rear of the pulleys $d$, turns in bearings formed in radius-bars $i$, which are hung to the shaft of a grooved roller, $k$, back of the pressure-roller, leaving the pressure-roller $h$ free to rise and fall to accommodate itself to the grain passing between it and the carrying-bands. A series of bands, $l$, pass around rollers $h$ $k$ in the grooves, and communicate a positive motion to the pressure-roller.

The discharging-platform D is placed at a lower level than the supporting-platform C, and is provided with curved guard-rails $m$, which support the rake near the end of its forward motion. This platform is a segment of a circular disk, and the grain is discharged from the rear of it in a direction opposite to the progressive motion of the machine. An upright rake-post, O, located in the central angle of the discharging-platform, rests on the sill in suitable bearings, and is supported at its top by a guide, $p$, strongly bolted to a second post, $j$, which is strongly tied and braced at the top to the frame-work of the machine, in order to resist the strain of the rake. Two horizontal arms, $r$, extend from the rake-post over the delivering-platform. In the outer end of these arms holes are made for the reception of the rake handle or axis $s$. These arms receive a vibratory motion over the platform, turning on the rake-post O as a center. They communicate their motion to the rake T, which, playing loosely in these arms, is free to rise and fall, and also to turn on its axis in these arms.

On each end of the rake-head $t$ is a friction-roller, $u$, for the purpose of diminishing the friction of the rake, which rests on the guard-rails $m$ near the end of its forward movement.

The teeth $v$ of the rake are so arranged in relation to the comb-teeth $g$ as to be in the same vertical plane at the end of the backward motion of the rake. By this arrangement the rake-teeth are prevented from striding or cutting the bands $e$ when the rake falls after having completed its backward movement, while at the same time the comb-teeth form inclined planes on which the rake slides to the lower platform.

To a cross-bar, $w$, connecting the two arms $r$, is pivoted a lever, $x$, which works in a slot, $y$, in the rake-handle $s$. The inner end of this lever traverses the upper surface of a fixed cam-guide, $z$, on its outward motion and the under surface of the same on its inward motion. A spiral spring, $a'$, coiled around the rake-handle $s$, acts upon the outer end of this lever $x$ and reverses it at the end of the outward motion of the rake after it has passed the point of the cam, throwing the inner end of the lever from the upper to the under side of the cam, thus sliding the rake in the arms and elevating it above the grain during its return. At the commencement of the return movement of the rake this lever is not acted upon by the cam, so that the rake remains at the same level it was during its forward motion until it draws the grain that has become entangled in its teeth a sufficient distance back from the edge of the platform to prevent its being jolted off and scattered on the ground between the gavels. A curved arm, $b'$, attached by a set-screw near the top of the rake-handle $s$, passes through a vertical swiveled guide, $c'$, attached to the pitman $d$, from which, through the horizontal arms $r$, the rake derives its vibratory motion over the platform. This arm $b'$, in connection with the guides $c'$, turns the rake on its axis in the arms and regulates the transverse position of the rake-head $t$ in relation to the platform, turning it so as to be parallel to the inner and outer end of the discharging-platform at the end of its motion in both directions. The curved arm rests upon the bottom of the guide and assists to support the rake during its entire forward movement, and regulates its height above the surface of the discharging-platform at the commencement of its forward motion. The vibratory motion is given to the arms $r$ and also to the rake by means of a vertical crank-shaft, $e'$, to which crank one end of the pitman $d'$ is pivoted, its opposite end being connected by means of braces $f'$ $g'$ with the outer end of the upper arm $r$ and the center of the rake-post $o$.

A horizontal shaft, $h'$, in rear of the driver's seat $i$, has attached to it a cone-pulley, $k'$, and is connected with and giving motion to the crank-shaft $d'$ by means of bevel-gearing. A horizontal shaft, $l'$, in front of the driver's seat, also provided with a cone-pulley, $m'$, communicates motion to the rear shaft, $h'$, by means of a band, $n'$, passing under the driver's seat and around the cone-pulleys. A shipping-lever, $o'$, for shifting this band is pivoted to the driver's seat with its handle extending forward, so that it can be acted on by the driver's leg, enabling him at any moment to change the velocity of the rake by moving the band on the cone-pulleys. The pulleys on the outer end of the receiving-platform, as well as the pressure-roller, derive their motion from the driving-wheel by means of gearing and banding. The rake, when released at the end of its backward motion, falls by its own gravity between the delivered grain and the pressure feed-roller, striking the teeth of the comb, which prevents its further descent until it is carried forward by the reciprocating arms, when it slides gently down on the teeth of the comb and between the carrying-bands to the lower platform. As the rake moves forward with greater velocity than the grain is delivered by the carrying-bands and pressure-roller, it effects a division of the grain which is delivered from that which is on the bands, the latter being retained on the bands by the pressure-roller, and is thus prevented from being drawn off by the rake on its forward motion.

Having thus described my improvements in self-raking harvesters, what I claim therein as new, and desire to secure by Letters Patent, is—

1. The combination of the carrying-bands and the pressure feed-roller with the rake, when arranged and operated substantially as described.

2. The combination of the spring-comb with the rake, carrying-bands, and pressure-rollers, when arranged substantially in the manner and for the purpose described.

3. The rake, when arranged on the arms that support and give to it its reciprocating movement, as described, in combination with the mechanism for raising, lowering, and turning it in these arms, for the purpose set forth.

In testimony whereof I have hereunto subscribed my name.

REUBEN DANIELS.

In presence of—
  F. SOUTHGATE SMITH,
  WM. D. BALDWIN.